US012798030B2

(12) United States Patent
Jagdav

(10) Patent No.: US 12,798,030 B2
(45) Date of Patent: Nov. 17, 2026

(54) REMOTE OPERATED MULTI-MACHINE TOOL TOUCHER

(71) Applicant: Harjit Singh Jagdav, Edmonton (CA)

(72) Inventor: Harjit Singh Jagdav, Edmonton (CA)

(73) Assignee: Harjit Singh Jagdav, Edmonton (CA)

( * ) Notice: Subject to any disclaimer, the term of this patent is extended or adjusted under 35 U.S.C. 154(b) by 286 days.

(21) Appl. No.: 18/811,667

(22) Filed: Aug. 21, 2024

(65) Prior Publication Data

US 2026/0054341 A1 Feb. 26, 2026

(51) Int. Cl.
*B23Q 17/00* (2006.01)

(52) U.S. Cl.
CPC .................................. *B23Q 17/006* (2013.01)

(58) Field of Classification Search
CPC .................................................... B23Q 17/006
USPC .................. 33/201, 626, 628, 636, 638, 639
See application file for complete search history.

(56) References Cited

U.S. PATENT DOCUMENTS 4,428,055 A 1/1984 Zurbrick et al.
4,608,763 A 9/1986 Manns et al.
5,418,730 A * 5/1995 Mariani ............... G01B 21/047 33/505
5,949,352 A 9/1999 Ferrari
6,095,728 A * 8/2000 Howie ............... G01D 5/34753 33/642
6,736,384 B2 * 5/2004 Yokota .................... B25B 5/061 269/27
6,796,050 B2 * 9/2004 Haimer ............... B23B 31/1179 33/639
7,252,466 B1 * 8/2007 Roch .................. G05B 19/4015 409/187
7,578,037 B2 * 8/2009 Pfau ...................... B23P 11/027 409/218
7,866,056 B2 1/2011 Ould et al.
8,434,392 B1 5/2013 Lerner et al.
8,676,533 B2 3/2014 Wooldridge et al.
9,517,540 B1 * 12/2016 Dring ....................... B23Q 3/06
9,835,433 B1 12/2017 Antreasyan et al.
9,903,699 B2 2/2018 Benedict et al.
11,257,513 B1 * 2/2022 Levin ................... B23Q 17/006
11,556,901 B2 * 1/2023 Kurokami .......... G05B 19/4155
(Continued)

FOREIGN PATENT DOCUMENTS

CA 1234893 A 4/1988

*Primary Examiner* — George B Bennett
(74) *Attorney, Agent, or Firm* — Daniel Enea; Jordan Sworen; Argus Intellectual Enterprises, LLC

(57) ABSTRACT

A remote operated multi-machine tool toucher is provided. The remote operated multi-machine tool toucher includes a housing having an arm extending from a base, with a tool position determiner engaged with the arm and configured for linear movement between a first distal end of the arm and a first side of the base. The first side includes a collet receiver sized to receive a collet. The tool position determiner has a probe to detect tool height data of a tool positioned within a collet seated within the collet receiver. The tool toucher includes a receiver that can wirelessly transmit the tool height data to a milling machine via a wireless transceiver of the housing. An interface screen is provided for receiving user inputs and displaying tool height data outputs. A first system moves the tool position determiner, stopping upon detection of the tool via the probe.

20 Claims, 6 Drawing Sheets

(56) References Cited

U.S. PATENT DOCUMENTS

| | | | | |
|---|---|---|---|---|
| 12,491,596 | B2 * | 12/2025 | Seichter ............ | B23Q 11/1015 |
| 2009/0025243 | A1 | 1/2009 | Prestidge et al. | |

* cited by examiner

REMOTE OPERATED MULTI-MACHINE TOOL TOUCHER

BACKGROUND OF THE INVENTION

The present invention relates to milling machine tool touching devices. More specifically, the present invention pertains to a remote operated multi-machine tool toucher (ROMTT) that simplifies and enhances the tool touching process by eliminating the need for installation and mounting of other tool touch devices that take up space on the milling machine and particular to that machine.

Accurate tool touching is critical for ensuring precision in machining operations within milling machines including CNC milling machines, and vertical and horizonal mills. Traditional methods of tool touching involve the use of manual measurements or probe-based systems, both of which present significant drawbacks. Manual tool touching requires a skilled operator to measure the tool's height and manually input this data into the machine. This process is time-consuming, typically taking around five minutes per tool, and is prone to human error, leading to inaccurate measurements and potential damage to the tool or machine. The reliance on specialized skills further increases the risk of errors and accidents, compromising safety and reliability.

Probe-based systems, while more automated, still have notable limitations. These systems require installation and mounting of the probe on the machine, which can be complex and restricts the probe's use to a single machine. Additionally, probes typically send only signals rather than precise data, resulting in less persistent measurements. The installation process can also be cumbersome, necessitating downtime for setup and calibration, thereby impacting overall productivity.

Another significant limitation of both manual and probe-based systems is their lack of portability. Once installed, probes are fixed to a particular machine, and their installation occupies dedicated space within the machine's working area, reducing the available workspace and flexibility. Traditional systems are often not designed for easy transfer between machines, limiting their versatility in operations involving multiple milling machines.

Given these challenges, there is a clear need for a solution that addresses the limitations of existing tool touching methods. The ROMTT provides a system for tool touching that eliminates the need for installation, mounting, or specialized skills to take measurements or operate a measurement taking system. The device allows it to be used with multiple machines without requiring any modifications to the machines themselves.

The ROMTT comprises a touch screen tablet/remote, a tool height determiner, and a receiver connected to the machine via a port. This setup allows for wireless transmission of tool height data directly into the machine, maintaining high accuracy within ±0.0005 inches. The plug-and-play design of the ROMTT ensures immediate usability without complex setup or calibration, significantly reducing the time required for tool touching to approximately 40 seconds per tool. Moreover, the ROMTT enhances safety by minimizing human error and eliminating the risks associated with manual tool touching. Its compact, battery-operated design makes it easily portable, allowing operators to use a single device across multiple machines. The user-friendly touch screen remote simplifies the process further, making it accessible to operators without specialized skills or knowledge.

Therefore, the ROMTT presents a significant advancement in the field of milling machine tool touching, addressing the shortcomings of traditional methods and providing a more efficient, safe, and versatile solution.

In light of the devices disclosed in the known art, it is submitted that the present invention substantially diverges in design elements and methods from the known art and consequently it is clear that there is a need in the art for a tool touching device that is usable for a variety of milling machines while being accurate and easy to use. In this regard the instant invention substantially fulfills these needs.

SUMMARY OF THE INVENTION

In view of the foregoing disadvantages inherent in the known types of tool touching devices and systems now present in the known art, the present invention provides a remote operated multi-machine tool toucher. The remote operated multi-machine tool toucher comprises a housing having an arm extending from a base, with a tool position determiner engaged with the arm and configured for linear movement between a first distal end of the arm and a first side of the base. The first side includes a collet receiver sized to receive a collet in a tool measuring configuration. The tool position determiner comprises a probe configured to detect tool height data of a tool positioned within a collet seated within the collet receiver. The tool toucher includes a receiver configured to be operably connected to a milling machine and wirelessly transmit the tool height data to the milling machine via a wireless transceiver of the housing. An interface screen is provided for receiving user inputs and displaying outputs of the tool toucher, and a first system is configured to linearly move the tool position determiner between an initial position and a lower position, stopping upon detection of the tool via the probe.

It is an objective of the present invention to offer a Remote Operated Multi-Machine Tool Toucher (ROMTT) that provides highly accurate tool height measurements. This is achieved through the use of a probe within the tool position determiner, which ensures precision within ±0.0005 inches for each tool height measurement.

It is an objective of the present invention to offer a ROMTT that simplifies the tool touching process, eliminating the need for specialized skills. The user-friendly interface screen and touch screen tablet/remote allow operators to input tool data and receive outputs easily, thereby reducing the risk of human error and enhancing operational efficiency.

It is an objective of the present invention to offer a ROMTT that enhances safety during the tool touching process. By minimizing manual interventions and utilizing automated movements and wireless data transmission, the ROMTT significantly reduces the potential for accidents and injuries. It is an objective of the present invention to offer a ROMTT that significantly reduces the time required for tool touching. The device's efficient design enables it to perform tool height measurements in approximately 40 seconds per tool, compared to the traditional method which takes around five minutes.

It is an objective of the present invention to offer a ROMTT that is portable and versatile. The compact, battery-operated design allows the ROMTT to be easily moved and used across multiple milling machines without the need for installation or dedicated workspace within the machines.

It is an objective of the present invention to offer a ROMTT that integrates with existing milling machines. The device connects via an RS232 serial port and wirelessly transmits tool height data, ensuring compatibility and ease of use with current machine setups.

It is therefore an object of the present invention to provide a new and improved ROMTT that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
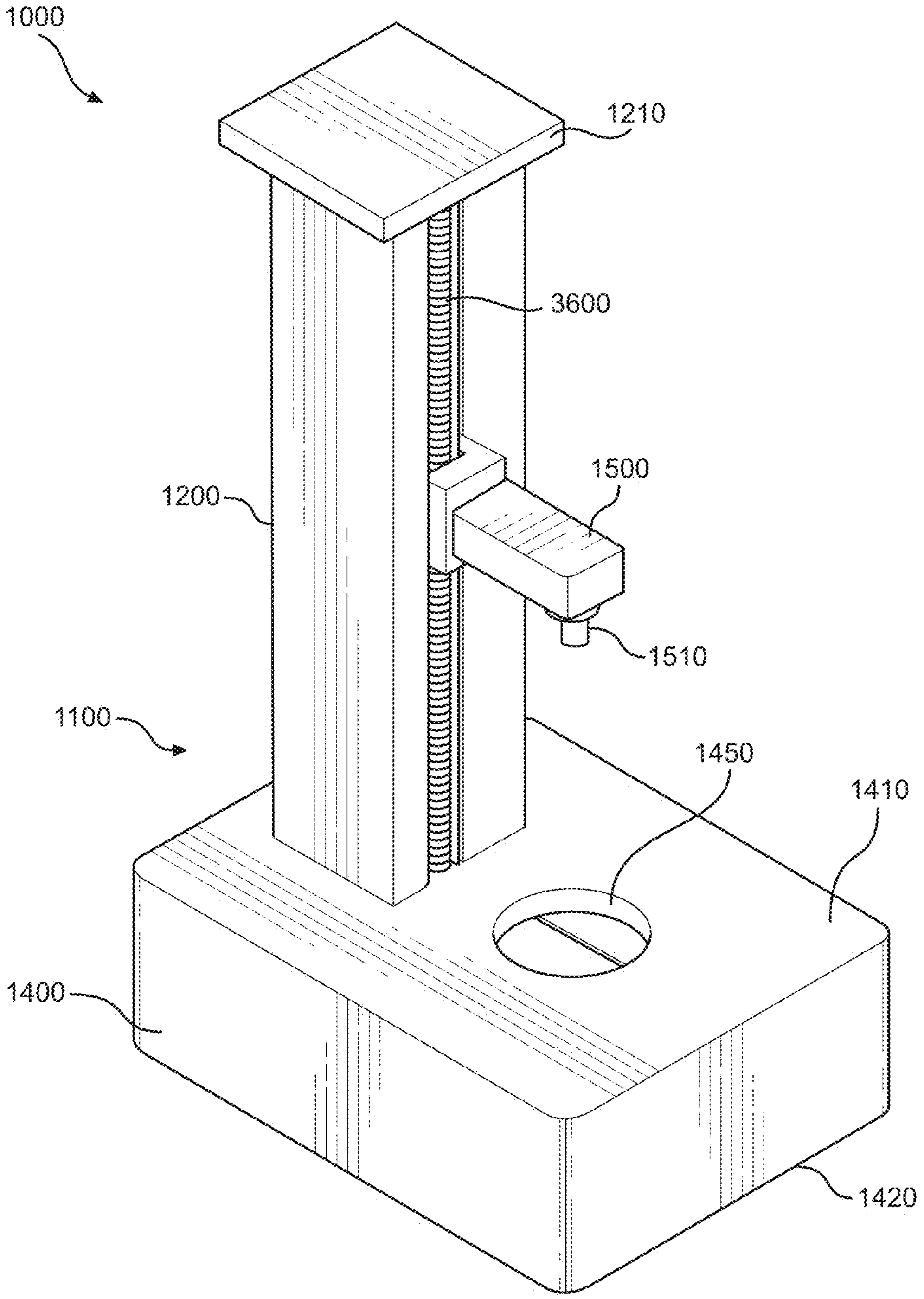
FIG. 1 shows a perspective view of an embodiment the remote operated multi-machine tool toucher.

Reference is made herein to the attached drawings. Like reference numerals are used throughout the drawings to depict like or similar elements of the system. For the purpose of presenting a brief and clear description of the present invention, the embodiment discussed will be used for determining the relative position of a tip of a tool disposed within a collet, which is in turn positioned within the collet receiver. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to “one embodiment,” “at least one embodiment,” “an embodiment,” “one example,” “an example,” “for example,” and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase “in an embodiment,” “first embodiment,” “second embodiment,” or “third embodiment” does not necessarily refer to the same embodiment.

As used herein, “computer-readable medium” or “memory” excludes any transitory signals, but includes any non-transitory data storage circuitry, e.g., buffers, cache, and queues, within transceivers of transitory signals. As used herein, “logic” refers to (i) logic implemented as computer instructions and/or data within one or more computer processes and/or (ii) logic implemented in electronic circuitry.

Referring to FIG. 1, there is shown a perspective view of an embodiment the remote operated multi-machine tool toucher (ROMTT). The ROMTT 1000 provides a reliable and efficient means of measuring the height of tools that are to be used in a variety of milling machines without requiring manual intervention or specialized skills. The tool toucher 1000 comprises a housing 1100, an arm 1200, and a base 1400 which cooperatively interact to hold the tool and measure the position of a tip of the tool. This construction allows for consistent and accurate measurements by reducing deflection of the arm. The ROMTT’s compact and portable design further enables its use across multiple machines, making it a versatile tool in various machining environments.

In the shown embodiment, the base 1400 includes a box like structure that is adapted to rest atop a flat surface, such as a tabletop or floor. The arm 1200 extends upwards from the base 1400 and includes a tool position determiner 1500. The tool position determiner 1500 is configured for linear movement between a first distal end 1210 of the arm and a first side 1410 of the base, wherein the first side 1410 faces the tool position determiner 1500. The first side of the base 1410 also includes a collet receiver 1450 sized to receive a collet (shown in FIG. 3). In a tool measuring configuration, the collet is received within the collet receiver 1450. The first side of the base 1410 is flat and generally parallel to the lower side of the base 1420. Feet or other adjustment members disposed on the second side of the base 1420 to level the tool toucher 1000 on an irregular surface or to otherwise level the tool toucher 1000.

In one embodiment, the tool position determiner 1500 is operably connected to a first system 3000. The first system 3000 is configured to linearly move the tool position determiner 1500 along a vertical axis between an initial position and a lower position, wherein the tool position determiner 1500 is configured to stop movement upon detection of the tool via the probe. In some embodiments, is it contemplated that the tool position determiner 1500 moves along a horizontal axis or performs nonlinear movement. The probe within the tool position determiner 1500 is rigid to ensure durability and consistent performance. The tool position determiner 1500 is also adapted to be removably engaged with the arm 1200 to allow for maintenance and replacement if necessary. The upper surface of the base 1400 serves as a zero reference when determining the tool height to provide a consistent baseline for all measurements.

In some embodiments, the first system 3000 comprises a motor that moves the tool position determiner 1500 between the initial position and the lower position or until contact is made with the tool. The housing 1100 includes an encoder 3400 and a threaded member 3600 disposed in the arm 1200 and/or base 1400. The threaded member 3600 has a set number of threads per length that engages the tool position determiner 1500. Actuation of the motor 3200 causes movement of the tool position determiner 1500 along the threaded member 3600, and the encoder 3400 measures the linear motion of the tool position determiner 1500. In this configuration, the movement and location of the tool position determiner 1500 is precise and the movement is controlled during the measurement process.

Figure 2:
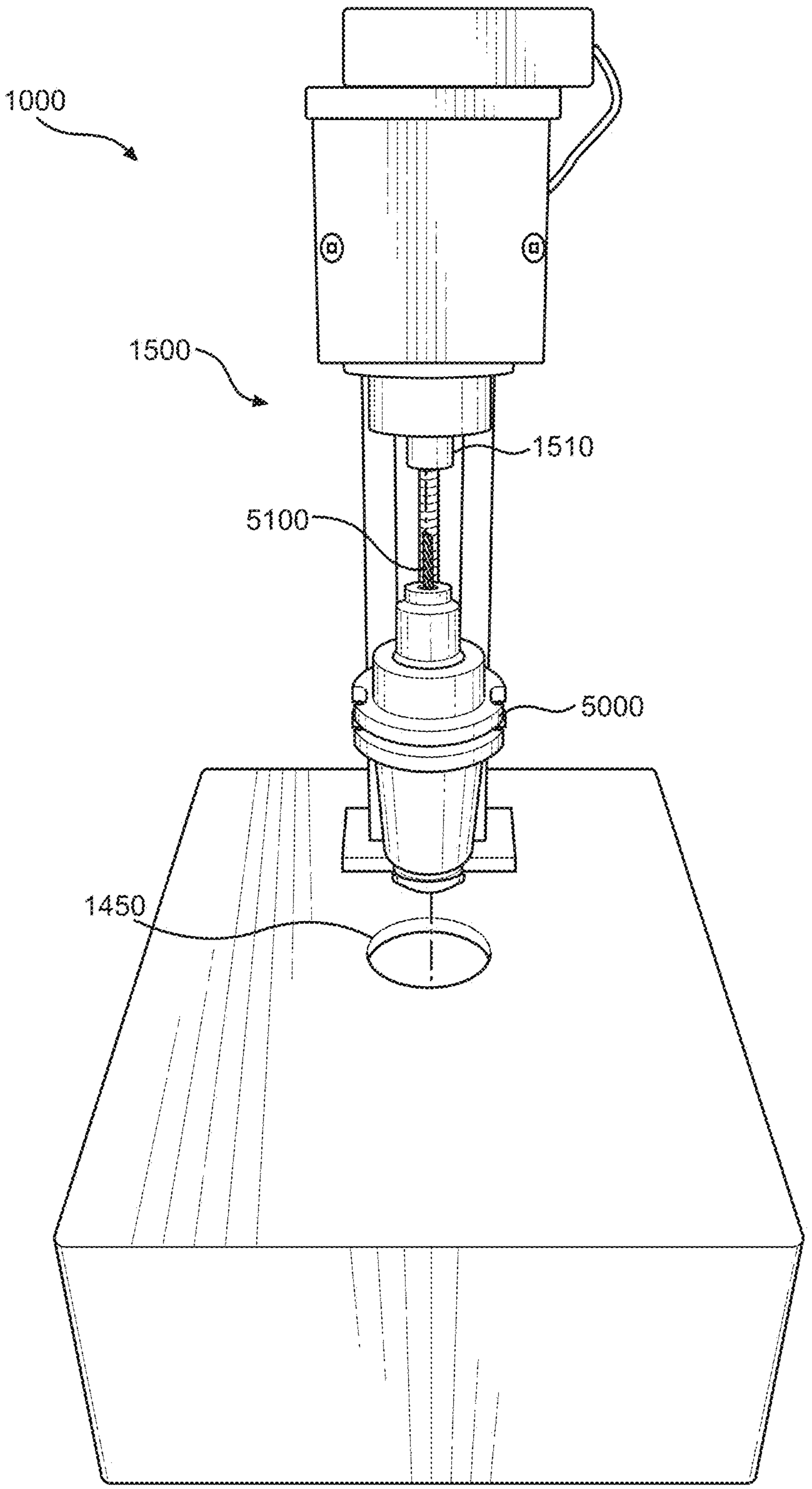
FIG. 2 shows a front perspective view of one embodiment of the remote operated multi-machine tool toucher with the collet being inserted into the collet receiver.
Figure 3:
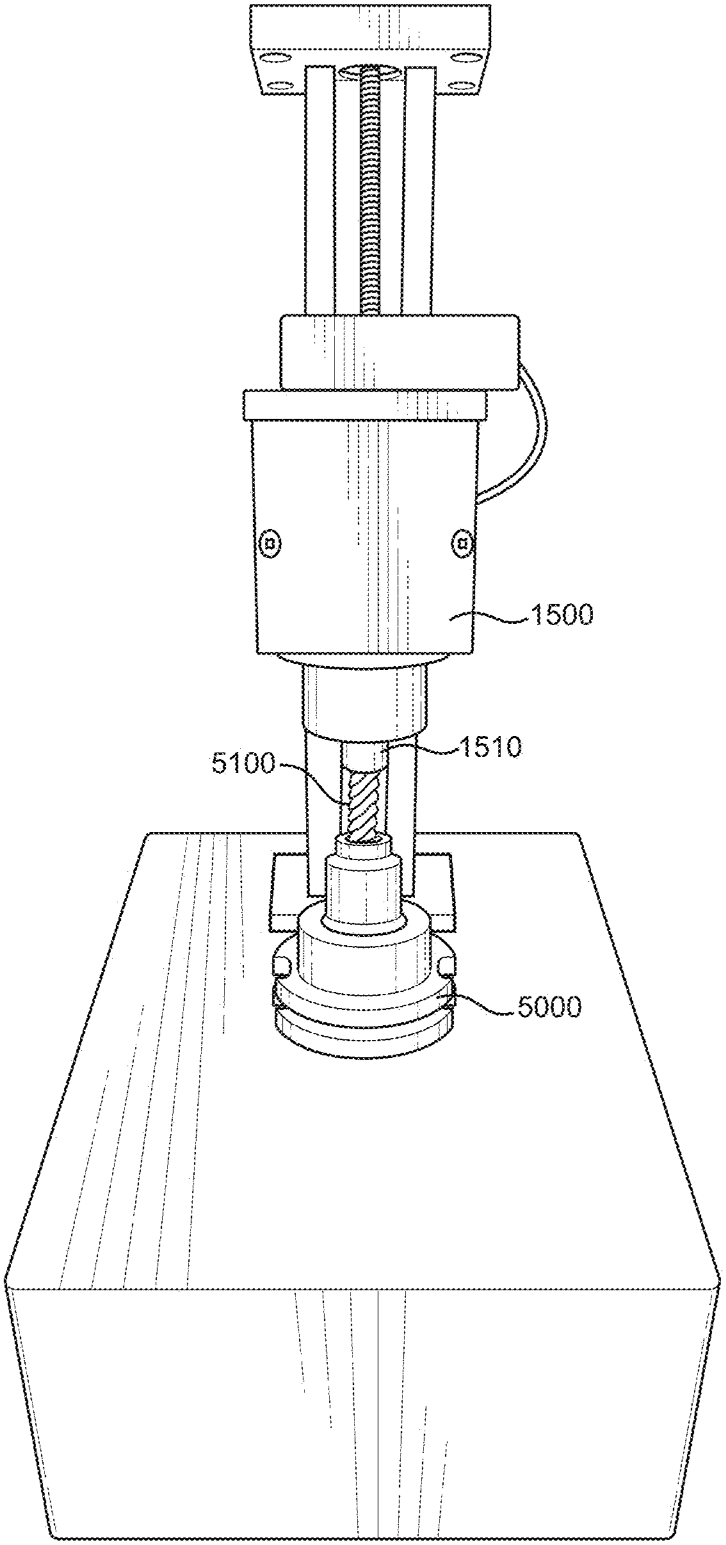
FIG. 3 shows a front perspective view of one embodiment of the remote operated multi-machine tool toucher with the tool position determiner touching the tool held within the collet which is seated within the collet receiver.

Referring to FIGS. 2 and 3, there is shown a front perspective view of one embodiment of the remote operated multi-machine tool toucher with the collet being inserted into the collet receiver and a front perspective view of one embodiment of the remote operated multi-machine tool toucher with the tool position determiner touching the tool held within the collet, which is seated within the collet receiver, respectively. The tool toucher 1000 ensures precise and consistent tool height measurements by securely positioning the tool 5100 within the collet receiver 1450.

In one embodiment, the tool position determiner 1500 comprises a probe 1510 configured to detect tool height data, wherein the tool height data includes the height of a tool positioned within the collet 5000 seated within the collet receiver 1450. Referring specifically to FIG. 2, the collet 5000 is shown being inserted into the collet receiver 1450. The collet 5000 is designed to securely hold the tool 5100 in place and is used on a variety of milling machines. Typically, the collet 5000 is a cylindrical or conical sleeve that is used to hold a tool or workpiece in place and includes central bore that is adjustable in size that is opened and closed around the tool 5100. When tightened, the collet exerts a strong clamping force evenly around the circumference of the object ensuring that it remains stationary during the measurement process. This secure positioning is crucial for achieving repeatable and consistent measurements. Tools 5100 of various diameters, shapes, and lengths are used within the same collet 5000. As used herein, "collet" includes a broad category of devices, including but not limited to, chucks, mandrels, sleeves, bushings, adapters, and clamps.

In the shown embodiment, the collet receiver 1450 is an opening that extends into the base 1400. The perimeter of the opening is sized to support a shoulder of the collet 5000. The design of the collet receiver 1450 ensures that the collet 5000 is properly seated every time to provide a reliable reference point for the tool position determiner 1500. In some embodiments, the collet receiver 1450 is tapered to friction fit the collet. When measuring the positioned of the tool tip, the tool position determiner 1500 detects the location of the tool tip and the tool toucher 1000 provides a measurement from the first side of the base to the tip of the tool.

Referring specifically to FIG. 3, the tool position determiner 1500 is shown touching the tool 5100 held within the collet 5000, which is seated in the collet receiver 1450. The probe 1510 of the tool position determiner 1500 contacts the tool 5100, allowing it to measure the tool height accurately. The linear movement of the tool position determiner 1500 is controlled by the first system 3000 to ensure that the measurement process is consistent and repeatable. The tool height data collected by the probe 1510 is then wirelessly transmitted to the milling machine via a receiver (shown in FIG. 4-6). In one embodiment, the housing includes a linear potentiometer configured to measure displacement and provide an analog signal representing the position of the tool position determiner. In another embodiment, the housing includes a linear variable differential transformer (LVDT) that is configured to convert linear motion into a variable electrical signal to determine the position of the tool position determiner. In one embodiment, the housing includes an optical linear scale configured to precisely measure the linear position of the tool position determiner 1500, providing high-resolution feedback to ensure the accuracy of the tool height measurement.

Figure 4:
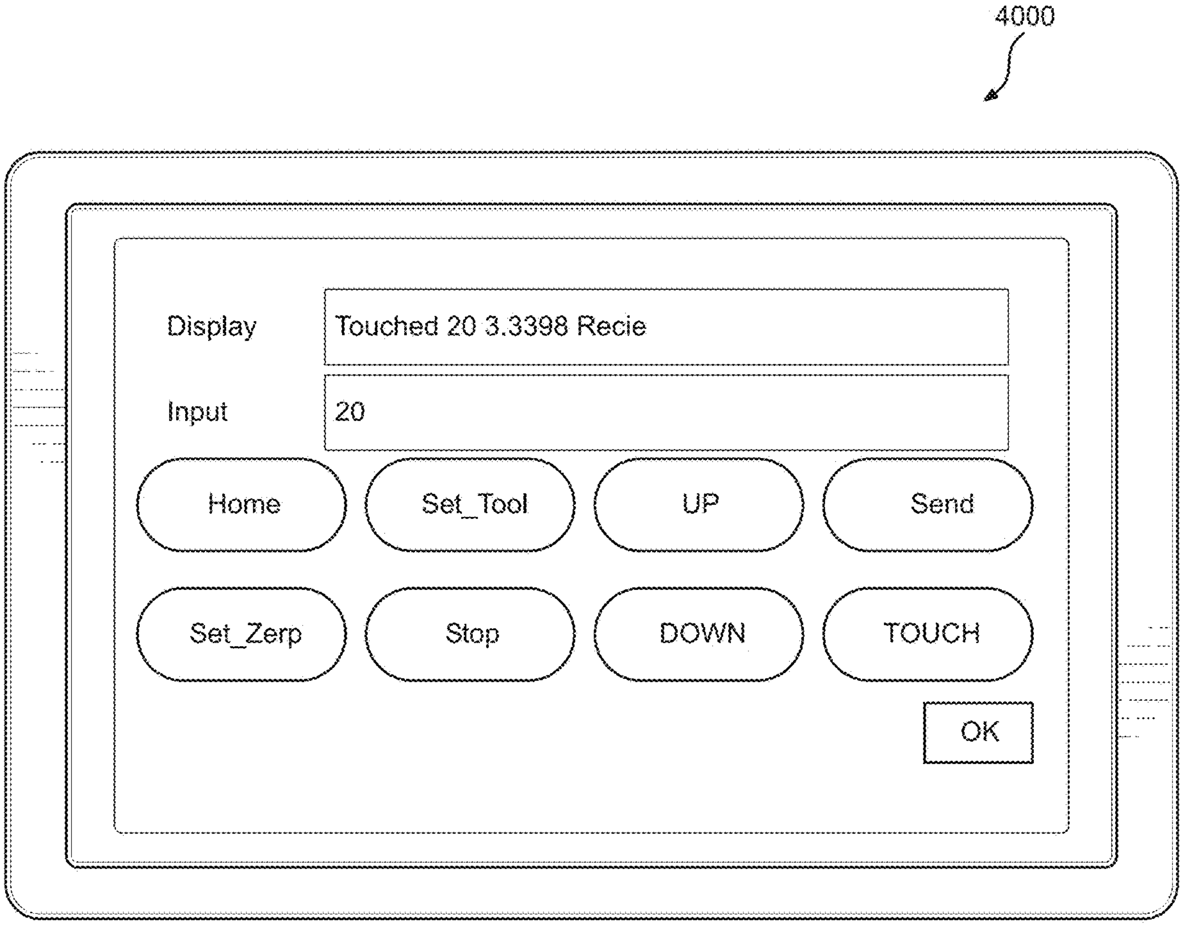
FIG. 4 shows a front view of an embodiment of an interface screen of the remote operated multi-machine tool toucher.
Figure 5:
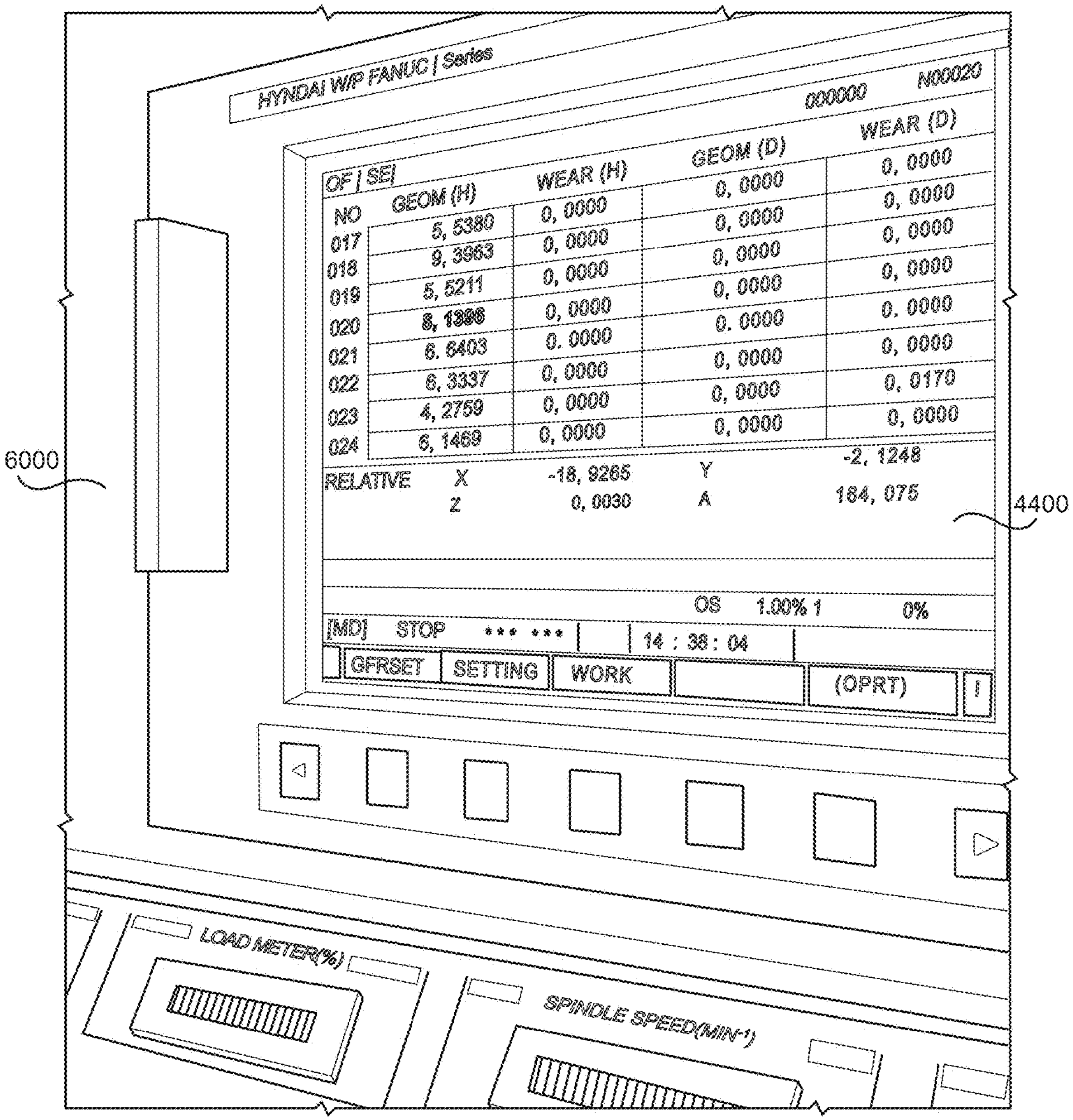
FIG. 5 shows a front view of an embodiment of a display screen of a milling machine that is operably connected to the remote operated multi-machine tool toucher.

Referring to FIGS. 4 and 5, there is shown a front view of an embodiment of an interface screen of the remote operated multi-machine tool toucher and a front view of an embodiment of a display screen of a milling machine that is operably connected to the remote operated multi-machine tool toucher, respectively. The tool toucher includes an interface screen 4000 for receiving inputs from a user and displaying outputs of the tool toucher. The interface screen 4000 provides real-time data on the tool height and other relevant metrics, allowing operators to monitor and control the tool touching process efficiently. In the shown embodiment, the interface screen 4000 is part of a touch screen tablet/remote which facilitates user interaction with the device. The interface screen 4000 is configured to display the position of the tool tip. Additionally, the device is configured to store various tools for future use, as well as allow for manual input of a variety of parameters. Additionally, the device would be used to configure the setup of multiple machines to transmit tool touch data. In one embodiment, a receiver (shown in FIG. 6) is configured to be operably connected to a milling machine and to wirelessly transmit the tool height data to the milling machine, wherein the receiver is in wireless communication with a wireless transceiver of the housing.

Referring specifically to FIG. 4, the interface screen 4000 is shown displaying the tool height data and other operational parameters. The touch screen tablet/remote 4000 is adapted to allow users to input the tool number and initiate the tool touching process with ease. The interface screen 4000 also provides diagnostic information and alerts regarding the status of the tool position determiner and the receiver. In the shown embodiment, the screen 4000 shows parameters such as manually moving the tool position determiner "UP" and "DOWN", "STOP" to halt the movement, and a "SEND" to transmit to data.

Referring specifically to FIG. 5, the display screen 4400 of the milling machine is shown. In many milling machines, they include a display screen 4400 that presents information related to the tool height and the like. These milling machines have a port for a connector to provide information exchange between the milling machine and other tool touch devices as described in the background section. In the shown embodiment, the receiver is configured to be operably connected to a milling machine via an RS232 serial port. In this way, the receiver automatically populates the parameters directly into the milling machine. These parameters include the tool height data received from the ROMTT for integrating this information into the machine's control system for precise machining operations. The seamless communication between the ROMTT and the milling machine ensures that the tool height data is accurately reflected in the machine's settings, allowing for high precision and repeatability in machining tasks.

Figure 6:
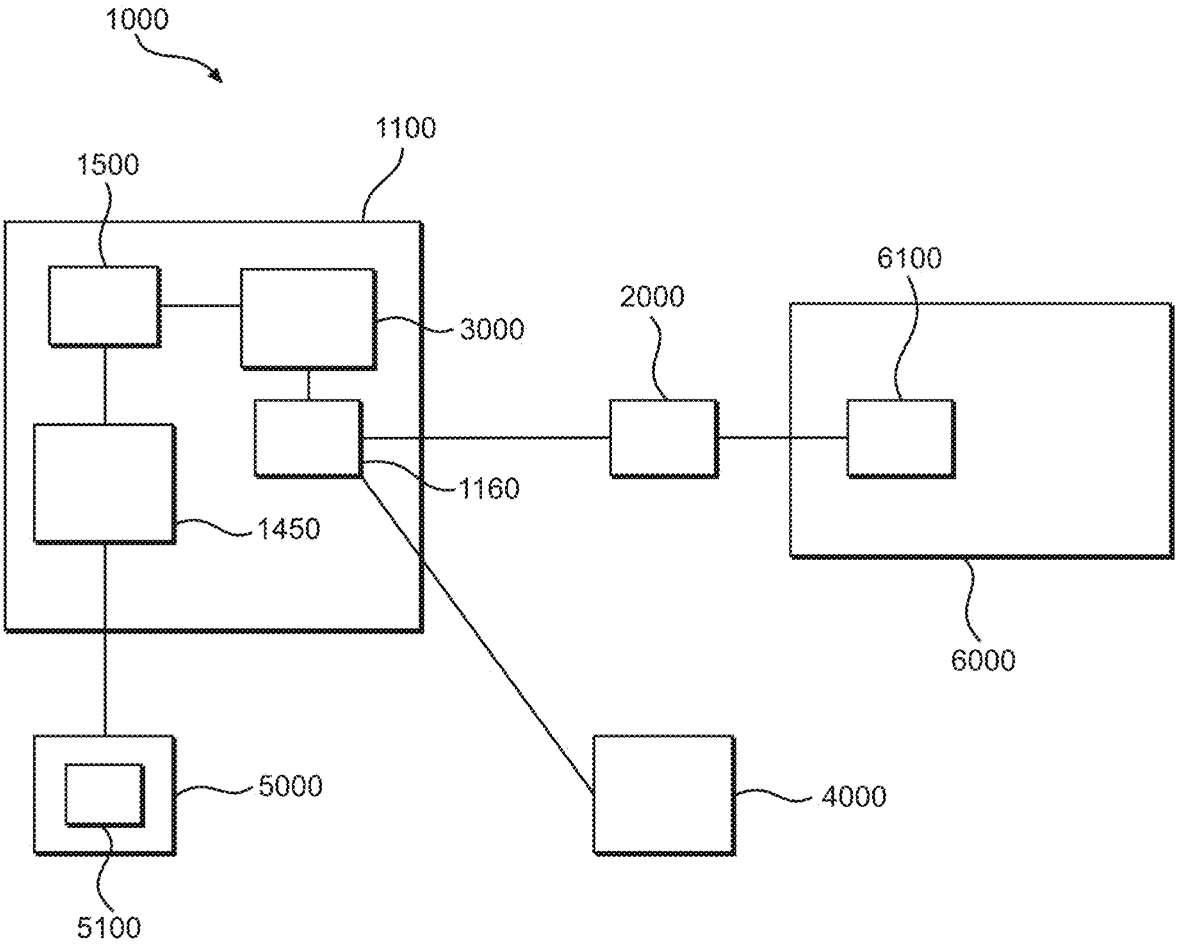
FIG. 6 shows a block diagram of the remote operated multi-machine tool toucher and milling machine.

Referring to FIG. 6, there is shown a block diagram of the remote operated multi-machine tool toucher and milling machine. In the shown embodiment, the ROMTT 1000 is in wireless communication with the receiver 2000, which is either wirelessly or wired to the milling machine 6000. The housing 1100 comprises the wireless transceiver 1160, which communicates with the receiver 2000 connected to the milling machine 6000 via an RS232 serial port 6100. The first system 3000, including the motor 3200, drives the tool position determiner 1500, while the probe 1510 collects tool height data. This data is processed and displayed on the interface screen 4000 and transmitted wirelessly to the milling machine 6000. In one embodiment, the interface screen 4000 is wirelessly communicating with the wireless transceiver 1160 of the housing 1100.

In one exemplary method for measuring a tool height of a tool 5100 within a collet 5000 using a tool toucher 1000, the method begins by providing the tool toucher 1000, the method comprises providing the tool touch device 1000 as shown and described herein, as well as providing a tool 5100 within the collet 5000, wherein the tool 5100 is secured therein. The collet 5000 is then inserted into the collet receiver 1450 on the first side 1410 of the base 1400. The base 1400 is placed on a stable, horizontal surface to ensure accurate and consistent measurements. The tool toucher 1000 is activated via the touch screen tablet/remote 4000, and the interface screen 4000 displays the initialization status and prompts the operator to input the necessary tool information, such as the tool number. A program is initiated that causes the tool position determiner 1500 to move relative to the tool 5100 by selecting the appropriate function on the touch screen tablet/remote 4000. The first system 3000, driven by the motor 3200, begins moving the tool position determiner 1500 from its initial raised position towards the tool 5100.

As the tool position determiner 1500 moves towards the tool 5100, the probe 1510 detects the exact position of the tool 5100. Upon contact with the tool 5100, the probe 1510 measures the tool height data. To ensure high accuracy, the probe 1510 touches the tip of the tool 5100 multiple times as part of a closed loop process. Each touch is recorded, and the measurements are averaged to generate additional tool height data and a final, precise tool height calculation. The first system 3000 ensures that the movement is precise and controlled, stopping the tool position determiner 1500 upon detection of the tool 5100. The measured tool height data is wirelessly transmitted from the probe 1510 to the receiver 2000. The receiver 2000, in wireless communication with the wireless transceiver 1160 of the housing 1100, ensures that the data is accurately communicated to the milling machine 6000. The milling machine 6000 receives the tool height data via the RS232 serial port 6100. The display screen 4400 of the milling machine 6000 then presents the tool height data, integrating this information into the machine's control system for precise machining operations. The operator can review the tool height data on the interface screen 4000 and the display screen 4400 to ensure that the measurement is accurate and proceed with the machining operations.

The tool height data is stored in a memory module 4200 for future reference. The interface screen 4000 generates an alert if the tool position determiner 1500 does not detect the tool 5100 within a predetermined time frame, ensuring that any issues are promptly addressed. After the tool height data is displayed and verified, the operator can reset the tool position determiner 1500 to its initial raised position using the touch screen tablet/remote 4000. The tool toucher 1000 is then ready for the next measurement or can be moved to another machine as needed.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A remote operated multi-machine tool toucher, comprising:

a housing having an arm extending from a base, wherein a tool position determiner is engaged with the arm and configured for linear movement between a first distal end of the arm and a first side of the base;

wherein the first side faces the tool position determiner and includes a collet receiver sized to receive a collet in a tool measuring configuration;

wherein the tool position determiner comprises a probe configured to detect tool height data, the tool height data being the height of a tool positioned within a collet seated within the collet receiver;

a receiver configured to be operably connected to a milling machine and to wirelessly transmit the tool height data to the milling machine;

wherein the receiver is in wireless communication with a wireless transceiver of the housing;

an interface screen for receiving inputs from a user and displaying outputs of the tool toucher, the outputs including the tool height data;

a first system configured to linearly move the tool position determiner between an initial position and a lower position, wherein the tool position determiner is configured to stop movement upon detection of the tool via the probe.

2. The remote operated multi-machine tool toucher of claim 1, further comprising an interface screen for receiving inputs from a user and displaying outputs of the tool toucher, the outputs including the tool height data.

3. The remote operated multi-machine tool toucher of claim 1, wherein the first system comprises a motor that moves the tool position determiner between the initial position and the lower position or until contact is made with the tool.

4. The remote operated multi-machine tool toucher of claim 3, wherein the housing includes an encoder and a threaded member disposed in the arm, the threaded member having a set number of threads per length that engages the tool position determiner, wherein actuation of the motor causes movement of the tool position determiner along the threaded member, and wherein the encoder measures the linear motion of the tool position determiner.

5. The remote operated multi-machine tool toucher of claim 3, wherein the housing includes an optical linear scale configured to measure the linear position of the tool position determiner.

6. The remote operated multi-machine tool toucher of claim 3, wherein the housing includes a linear variable differential transformer (LVDT) that is configured to convert linear motion into a variable electrical signal to determine the position of the tool position determiner.

7. The remote operated multi-machine tool toucher of claim 1, wherein the base is a platform configured to rest upon a horizontal surface, and wherein the first side is planar.

8. The remote operated multi-machine tool toucher of claim 1, wherein the receiver comprises a first receiver configured to transmit the tool height data to a first milling machine and a second receiver configured to transmit the tool height data to a second milling machine.

9. The remote operated multi-machine tool toucher of claim 1, wherein the tool position determiner is removably engaged with the arm.

10. The remote operated multi-machine tool toucher of claim 1, wherein the upper surface of the base is a zero reference when determining the tool height.

11. The remote operated multi-machine tool toucher of claim 1, wherein the probe is rigid and adapted to detect the position of the tool with an accuracy of ±0.0005 inches and wirelessly transmit the tool height data to the milling machine.

12. The remote operated multi-machine tool toucher of claim 1, wherein the receiver is configured to be operably connected to a milling machine via an RS232 serial port, wherein the receiver is configured to selectively connect to a second milling machine for a second set of tool height data to the second milling machine.

13. The remote operated multi-machine tool toucher of claim 2, wherein the interface screen is configured to provide diagnostic information and alerts to the operator regarding the status of the tool position determiner and receiver.

14. A method for measuring a tool height of a tool within a collet using a tool toucher, comprising: a) providing the tool toucher, the tool toucher comprising:

a housing having an arm extending from a base, wherein a tool position determiner is engaged with the arm and configured for linear movement between a first distal end of the arm and a first side of the base;

wherein the first side faces the tool position determiner and includes a collet receiver sized to receive a collet in a tool measuring configuration;

wherein the tool position determiner comprises a probe configured to detect tool height data, the tool height data being the height of a tool positioned within a collet seated within the collet receiver;

a receiver configured to be operably connected to a milling machine and to wirelessly transmit the tool height data to the milling machine;

wherein the receiver is in wireless communication with a wireless transceiver of the housing;

a first system configured to linearly move the tool position determiner between an initial position and a lower position, wherein the tool position determiner is configured to stop movement upon detection of the tool via the probe;

b) initiating a program that causes the tool position determiner to move relative to the tool;

c) recording tool height data of the tool;

d) transmitting the tool height data to the receiver.

15. The method of claim 14, further comprising: repeating step (c) as part of a closed loop process to generate additional tool height data.

16. The method of claim 15, further comprising: using the additional tool height data to generate a final tool height calculation.

17. The method of claim 14, further comprising: displaying the tool height data on an interface screen for user review.

18. The method of claim 14, wherein the program includes a calibration step to ensure the accuracy of the tool position determiner before measuring the tool height.

19. The method of claim 14, further comprising: storing the tool height data in a memory module for future reference and generating an alert on the interface screen if the tool position determiner does not detect the tool within a predetermined time frame.

20. The method of claim 1, wherein the tool height data is transmitted to the milling machine via an RS232 serial port.

* * * * *